(12) United States Patent
LaBenne

(10) Patent No.: US 9,593,773 B1
(45) Date of Patent: Mar. 14, 2017

(54) VEHICLE GEAR SHIFTER

(71) Applicant: Schafer Driveline, LLC, Fredericktown, OH (US)

(72) Inventor: Christopher LaBenne, Mount Vernon, OH (US)

(73) Assignee: SCHAFER DRIVELINE, LLC, Fredericktown, OH (US)

( * ) Notice: Subject to any disclaimer, the term of this patent is extended or adjusted under 35 U.S.C. 154(b) by 55 days.

(21) Appl. No.: 14/683,213

(22) Filed: Apr. 10, 2015

(51) Int. Cl.
*F16H 63/34* (2006.01)
*F16H 1/22* (2006.01)
*B60K 17/34* (2006.01)

(52) U.S. Cl.
CPC ......... *F16H 63/3466* (2013.01); *B60K 17/34* (2013.01); *F16H 1/22* (2013.01)

(58) Field of Classification Search
CPC .. F16H 63/34; F16H 63/3416; F16H 63/3441; F16H 63/3458; F16H 63/3466; F16H 63/3483; F16H 63/36; F16D 11/00; F16D 11/08; F16D 2011/002; F16D 2011/004; F16D 2011/008
See application file for complete search history.

(56) References Cited

U.S. PATENT DOCUMENTS

| 2,883,020 A * | 4/1959 | Kummich | F16D 11/10 |
| | | | 192/114 R |
| 7,311,016 B2 * | 12/2007 | Busch | F16H 63/04 |
| | | | 74/363 |
| 7,406,888 B2 | 8/2008 | Busch et al. | |
| 8,261,899 B2 | 9/2012 | Geyer | |

* cited by examiner

*Primary Examiner* — Jacob S Scott
(74) *Attorney, Agent, or Firm* — MacMillan, Sobanski & Todd, LLC

(57) ABSTRACT

A vehicle transmission includes for an electric drive vehicle a clutch for selectively drivingly connecting an input shaft and an output shaft through a gear set. A clutch collar rotationally drives one or more axially aligned rows of at least two and preferably three drive members, such as ball bearings. The clutch collar is movable between drive position in which the input shaft and output shaft are drivingly engaged through two drive members, a park position in which one drive member is rotationally fixed to the housing, and a tow position in which the drive members are disengaged from the input shaft.

20 Claims, 9 Drawing Sheets

VEHICLE GEAR SHIFTER

FIELD OF THE INVENTION

The present invention relates to vehicles and more particularly to gear shifting arrangements.

BACKGROUND OF THE INVENTION

Various devices for transferring power in a vehicle transmission are known to those skilled in the art. One such device is a shifting collar utilized as part of a collar shift transmission. Collar shift transmissions are commonly used in certain vehicles such as all-terrain vehicles, but may be utilized in numerous other types of vehicles. Collar shift transmissions may be manually or power shifted. Examples of the collar shift transmission assemblies can be found in U.S. Pat. Nos. 7,406,888 and 8,261,899, the disclosures of which are hereby incorporated by reference. In these prior designs, shift collars having internal or external drive splines are utilized to engage corresponding drive splines on gears and other components such as a park flange. Drive spline engagement and disengagement can require significant force, especially when the transmission is under torque, for example, when the vehicle is fully loaded and parked on an incline or decline. It would be beneficial to reduce the engagement or disengagement force for easier and smoother operation of the transmission.

SUMMARY OF THE INVENTION

The present invention is a gearbox or transmission comprising including a housing, an input shaft, an output shaft, a gear set, and a clutch assembly for selectively drivingly connecting the input shaft and the output shaft through the gear set. The clutch assembly includes a clutch collar and at least two, and preferably three, axially spaced drive members, such as ball bearings, rotationally drivable by the clutch collar. The clutch collar is movable between (a) a Drive position in which the input shaft is drivingly engaged with one drive member and the output shaft is drivingly engaged with the input shaft through the other drive member and the gear set, (b) a Park position in which the gear set is drivingly engaged with one drive member and the other drive member is rotationally fixed to the housing, and (c) a Tow position in which the two drive members are disengaged from the input shaft.

Preferably, the clutch assembly includes internal grooves for driving engagement with the drive members, and a third drive member for assisting in alignment of various drive grooves for easier shifting. The clutch preferably includes several rows of circumferentially aligned drive members, each row circumferentially spaced around the inner cylindrical surface of the collar. A cage may be utilized to hold the drive members in axial and circumferential alignment.

DESCRIPTION OF PREFERRED EMBODIMENTS

Figure 1:
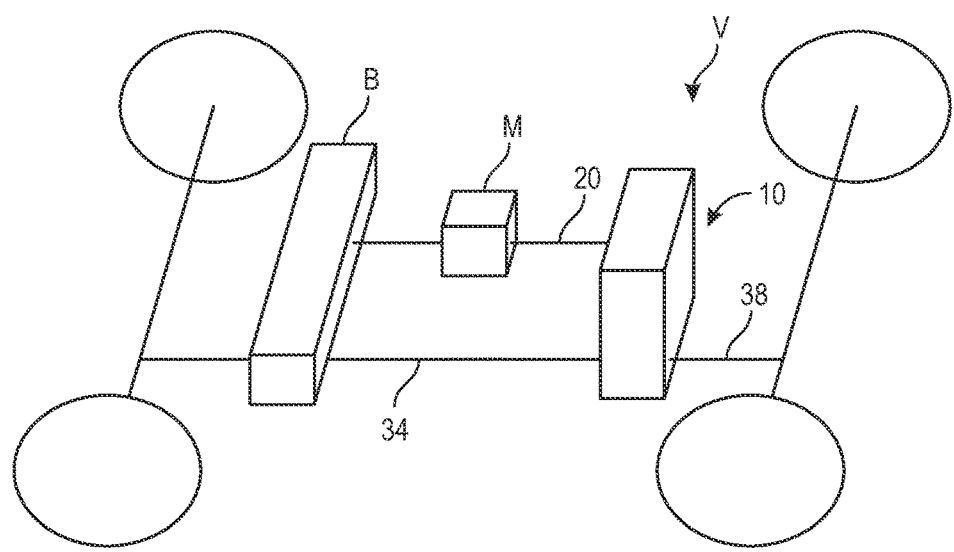
FIG. 1 is a schematic of an electric vehicle including a transmission in accordance with the present invention.

Referring to FIG. 1, a battery powered electric vehicle "V" includes a battery pack "B" which drives a main drive motor "M" to rotate an input shaft 20 of a gearbox or transmission assembly 10. The transmission 10 includes gear sets which selectively drivingly engage a rear output shaft 34 and a front output shaft 38 to drive the axles and wheels of the vehicle, as is well known in the art.

Figure 2:
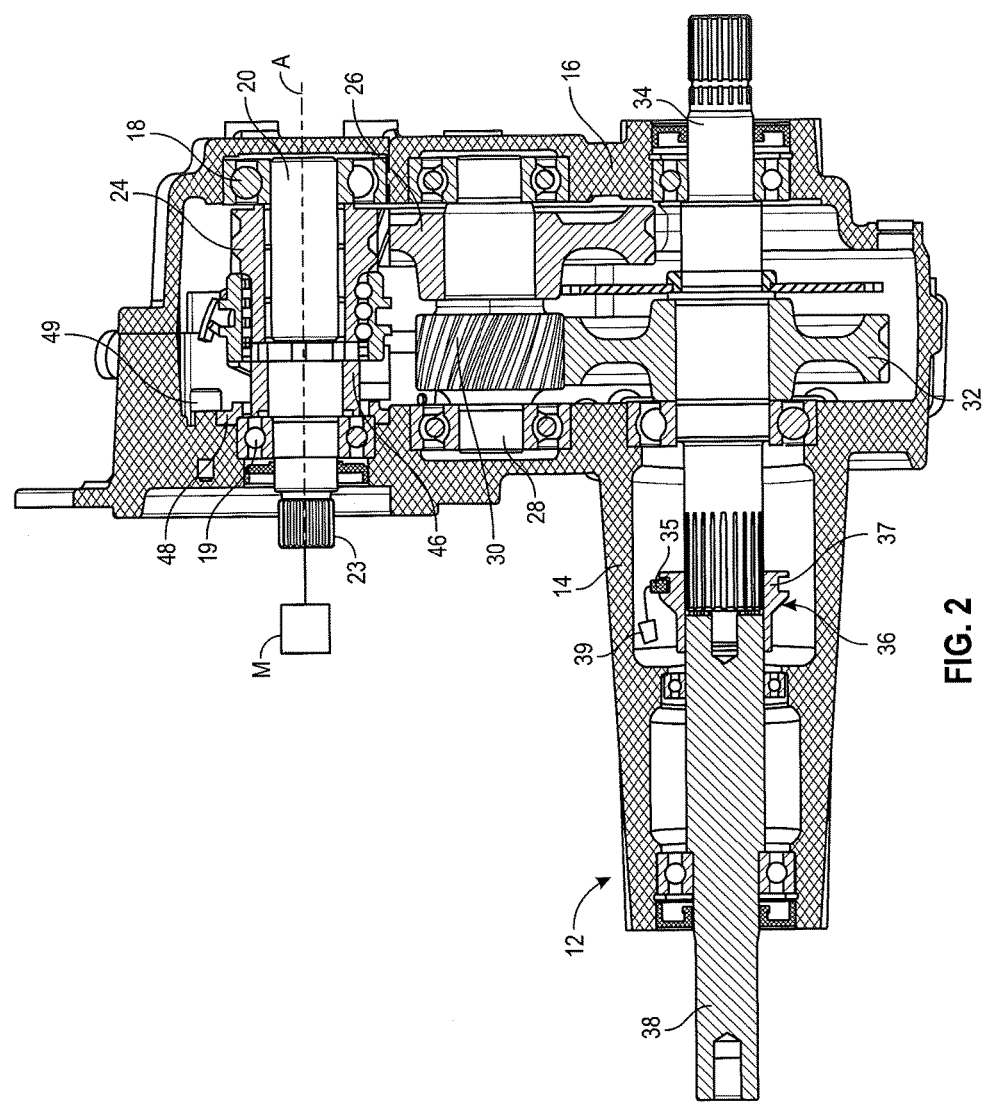
FIG. 2 a cross-sectional view of the transmission shown schematically in FIG. 1.

Referring to FIG. 2, the transmission 10 includes a housing assembly 12, which in a preferred embodiment includes a housing 14 and a cover 16. The input shaft 20 has an axis of rotation "A" and a spline 23 on an outboard end for driving connection with the electric motor. Of course, other prime movers may be utilized with the transmission 10, such as a gasoline engine. Input shaft 20 is supported by ball bearings 18, 19 and is adapted for selective driving engagement with helical input pinion gear 24. Pinion 24 drivingly engages helical intermediate gear 26 that is locked to intermediate shaft 28, and integral intermediate gear 30. Intermediate helical gear 30 drivingly engages helical output gear 32 that is locked to rear output shaft 34.

A clutch assembly 36 selectively drivingly engages rear output shaft 34 with front output shaft 38 to provide selective four-wheel drive. The clutch assembly 36 includes a clutch collar 37 which may be selectively splined to the front and rear output shafts as is well known in the art. The collar is axially movable by a small electric motor 39 which drives a shift fork 35 engaged with the collar 37.

Figure 3:
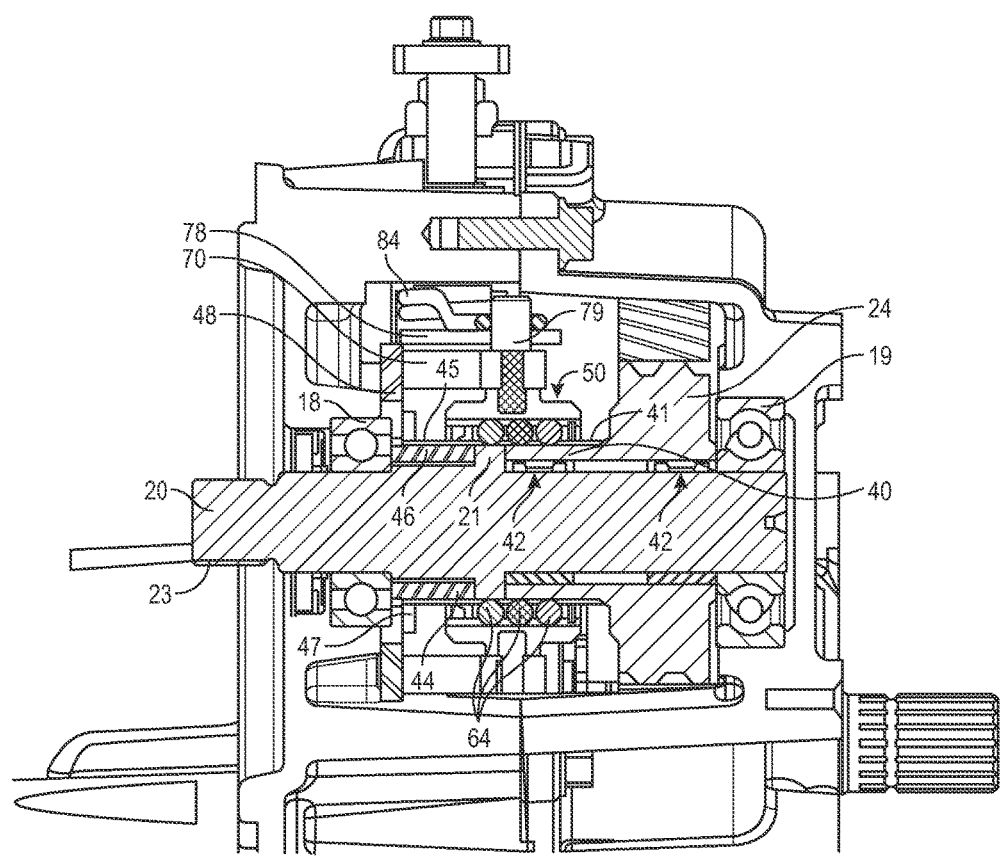
FIG. 3 a cross-sectional view of the input portion of the transmission of FIG. 1.
Figure 4:
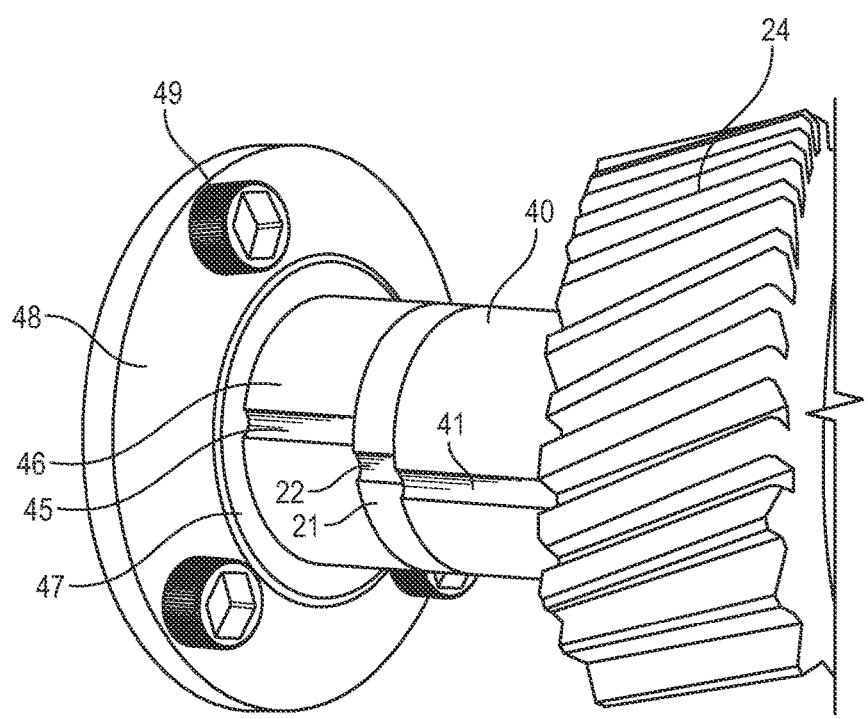
FIG. 4 is a perspective view of the shift collar engagement components of the transmission of FIG. 1.

The input shaft 20 and related components are shown in more detail in FIGS. 3 and 4. Input shaft 20 includes an integral radially outwardly extending annular flange 21. The outer surface of the flange 21 includes axially extending ball grooves 22. Pinion 24 includes an inwardly extending integral cylindrical section 40. The outer surface of cylindrical section 40 includes axially extending ball grooves 41. Needle bearings 42 support pinion 24 for rotation on the input shaft 20.

A park flange 44 includes a cylindrical portion 46 coaxial with and surrounding the input shaft 20 and an integral annular portion 48. The annular portion 48 is locked to the housing assembly 12 by cap screws 49 to prevent relative movement. An annular stop flange 47 is integral with the annular portion 48. The outer surface of the cylindrical portion 46 includes a series of axially extending ball grooves 45. Ball grooves 22, 41, and 45 are for engagement with drive members, preferably steel ball bearings, as will be described herein. A generally cylindrical shift collar assembly 50 surrounds the input shaft 20.

Figure 5:
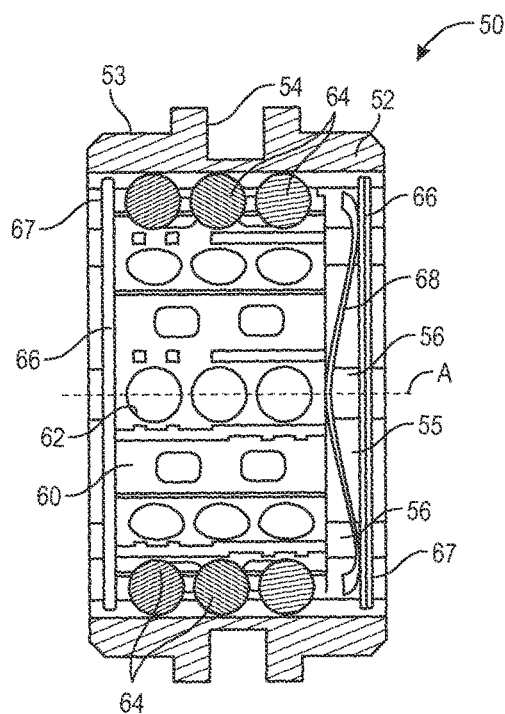
FIGS. 5 and 5A are cross-sectional views of the shift collar assembly of the transmission of FIG. 1.

FIG. 5 shows the shift collar assembly 50 in more detail. The assembly 50 includes a generally cylindrical shift collar 52 having an axis of rotation "A" and a radially outer surface 53 defining an annular yoke groove 54. The outer surface 53 has no splines or gear teeth and is not utilized as a driving surface, contrary to many prior art designs. The radially inner surface 55 of the shift collar 52 includes eight equally circumferentially spaced and axially extending ball grooves 56.

A generally cylindrical cage 60 is positioned within the shift collar 52. The cage may be constructed of a metal or a polymer. Spiralox retaining rings 66 are positioned in annular grooves 67 formed on the radially inner surface of the shift collar 52, one adjacent each axial end. A wave spring 68 is positioned within the shift collar 52 between one of the retainer rings 66 and an axial end surface of the cage 60. The wave spring 68 biases the shift collar 52 into engagement with the opposite axial end surface of the cage 60.

In one preferred embodiment, the cage 60 includes twenty-four circular apertures 62 for containing eight rows 58 of axially aligned drive members 64 in the form of steel balls. Each ball 64 is permanently rotationally drivingly engaged with the collar 52 through the grooves 56. The diameter of each steel ball 64 is about 0.25 inches, but the present invention is not limited to any particular ball size or material. For example, other metals or polymers may also be preferred in certain transmissions. The ball grooves 22, 41, 45, and 56 have radii generally the same or slightly larger than the ball radii to promote rolling and alleviate frictional contact. In a preferred embodiment, all of the balls 64 are identical, but other embodiments may utilize balls having varying sizes, with the corresponding groove radii varying accordingly.

Figure 5A:
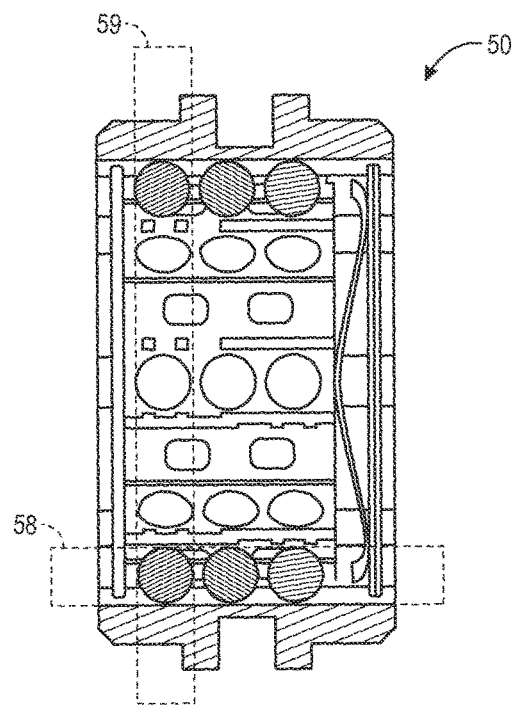

Referring to FIG. 5A, each ball row 58 includes three axially aligned balls 64. The eight ball rows 58 are equally circumferentially spaced around the cage to correspond to the spacing and positioning of the eight ball grooves 56 in the inner surface of the shift collar 50. Each of the three balls 64 in each ball row 58 is circumferentially aligned with the corresponding balls 64 in all of the other rows 58 to form three circumferential ball columns 59, each column 59 having eight circumferentially aligned balls 64.

The spacing and arrangement of the balls 64 is important in the shifting capability of the collar assembly 50 as will be explained herein. Of course, the number of grooves 56 and corresponding circumferential ball columns 59 may vary depending on the load requirements. Any number of ball rows 58 may be used; for example, four or even fewer ball rows 58 may be adequate for some applications. As will be seen, regardless of the number of ball rows 58, the shift collar assembly 50 includes at least two circumferential ball columns 59.

The following descriptions of the shift collar positions will be made referencing only one row 58 of drive members or balls 64. It will be understood by those skilled in the art that the same drive paths will apply to any number of additional rows 58 because the balls 64 will be aligned circumferentially in columns 59.

Drive Position

Figure 6:
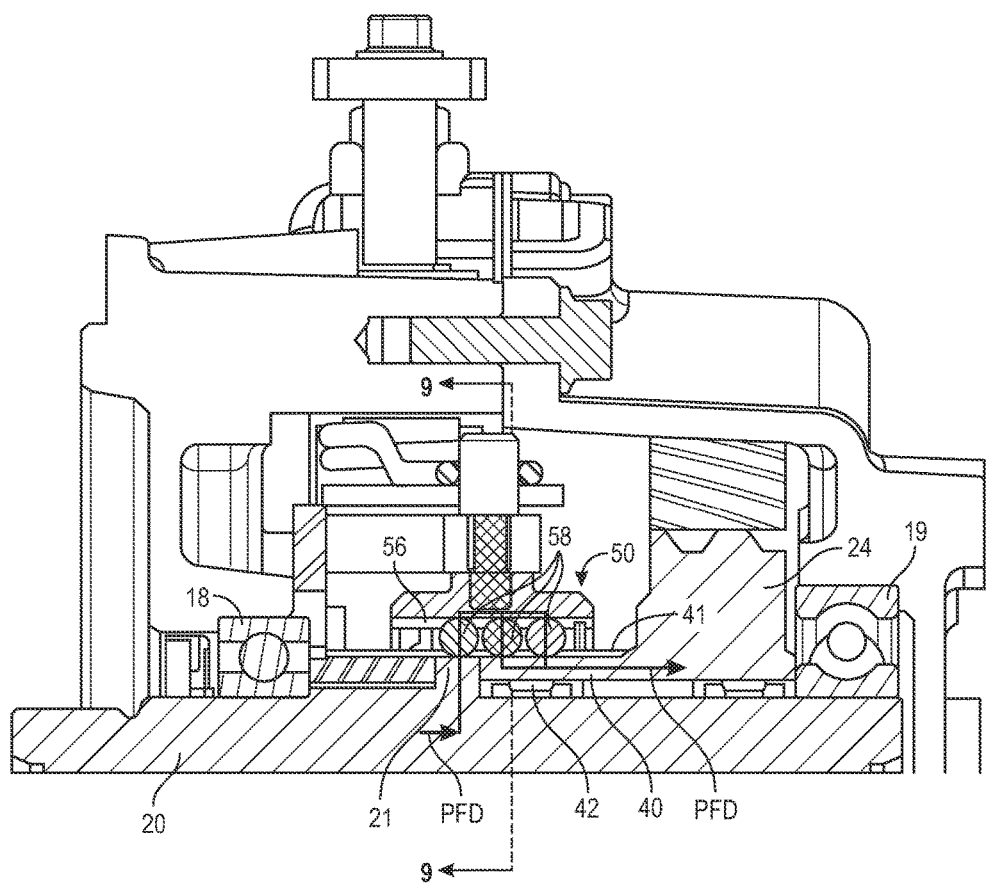
FIG. 6 is a cross-sectional view of the input portion of the transmission of FIG. 2 shown in a Drive position.

FIG. 6 illustrates the transmission 10 in the "Drive" position. The shift collar assembly 50 is axially positioned generally between the park flange stop 47 and the pinion 24. One row 58 of drive balls 64 is shown. The clutch collar is positioned over the input shaft flange 21 and the pinion cylindrical section 40 so that all three balls 64 in the row 58 engage the input groove 22 or the cylindrical section groove 41. The Drive position power flow path PFD extends from the input shaft 20 and input flange groove 22 through one ball 64 of the row 58 to the clutch collar groove 56, and then to the drive gear 24 through the other two balls 64 of the row 58 through the cylindrical portion groove 41. Although only one row 58 of balls is shown in FIG. 6, in the Drive position, all twenty-four balls 64 are actively transmitting torque.

However, it will be understood by those skilled in the art that a single row 58 having two balls 64 would provide the same drive path and my be adequate for certain designs.

Park Position

Figure 7:
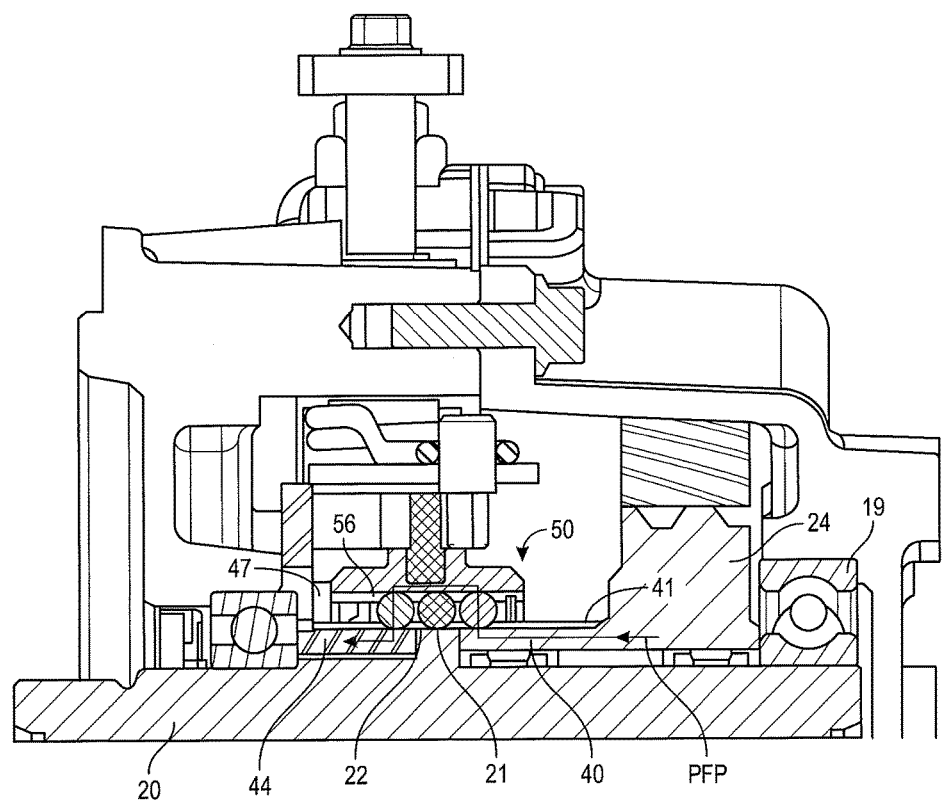
FIG. 7 is a cross-sectional view of the input portion of the transmission of FIG. 2 shown in a Park position.

Referring to FIG. 7, the transmission 10 is shown in the "Park" position in which the shift collar 50 is in a leftward position (as seen in FIG. 7), bottomed out against the park flange stop 47. In the Park position, the input shaft 20 is locked to the park flange 44 through the shift collar assembly 50. In the Park position, torque generally originates from the vehicle wheels and driveline through the pinion 24. The power flow path PFP passes thorough the cylindrical section groove 41 to one end ball 64 of the row 58, to the clutch collar groove 56, to the opposite end ball 64, and then to the park flange 44 through groove 45. This locks the pinion 24 to the housing assembly, thereby preventing rotation of the pinion 24. The middle ball 64 of the row 58 does not carry any significant torque in this Park position.

In the preferred embodiment having twenty-four balls 64, two of the balls of each row 58 (sixteen of the balls 64) are utilized to lock the pinion 24 to the housing 12. In the Park position, the input shaft 20 is rotationally fixed to the shift collar by the middle ball of the row 58, but fixing of the input shaft is not necessary for the Park function. However, because the middle ball is axially aligned with the other balls in the row 58 by the cage apertures 62, the middle ball will align the input shaft groove 22 with grooves 41 and 45 to allow easier shifting out of the Park position than the prior art designs. This is an important feature when the vehicle is in the Park position and is on an incline. In order to shift out of the Park position, alignment of the grooves is necessary and is difficult to achieve when the vehicle is not moving.

Tow Position

Figure 8:
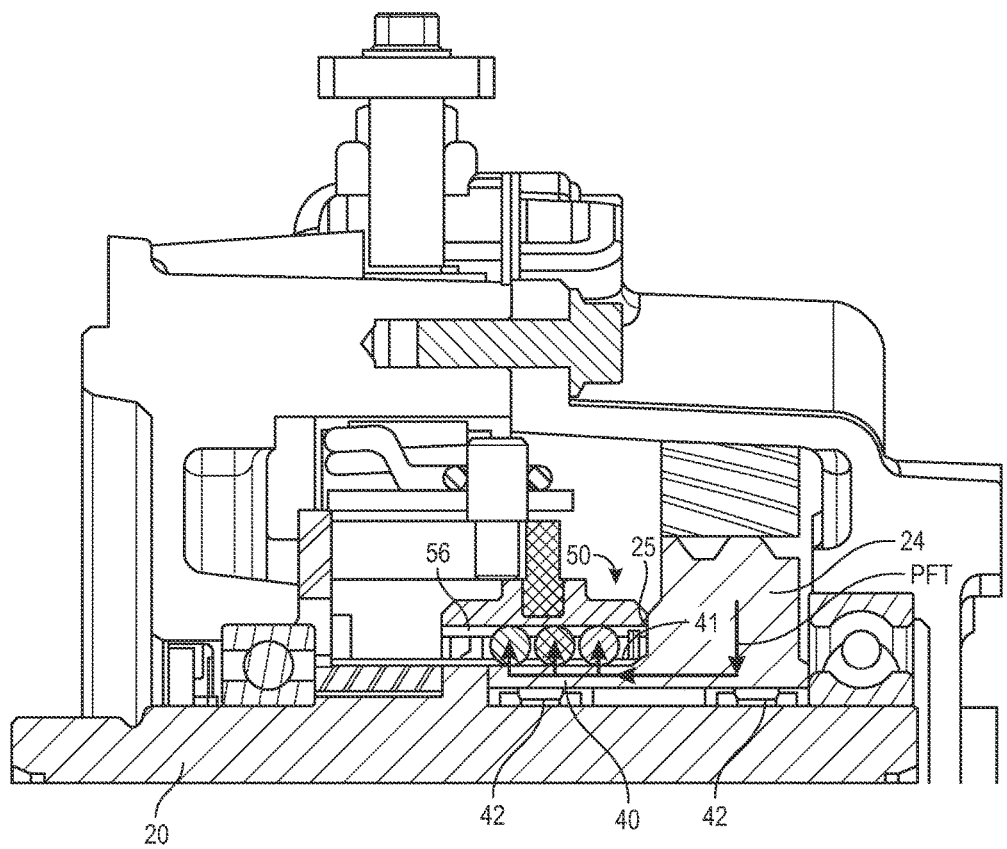
FIG. 8 is a cross-sectional view of the input portion of the transmission of FIG. 2 shown in a Tow position.

FIG. 8 illustrates the transmission 10 in the "Tow" or neutral position, wherein the clutch collar assembly 50 is positioned against a stop 25 integrally formed on the pinion 24. In the Tow position, all balls 64 of the row 58 are engaged with the splines 41 of the drive gear 24 and none engage the input shaft flange groove 22. In the Tow position, as in the park position, torque generally originates from the vehicle wheels and driveline through the pinion 24. When torque is applied to the pinion 24, for example, when the vehicle is being towed, the power flow path PFT ends at the pinion 24 and clutch collar 50. Bearings 42 allow the pinion 24 to freely rotate or "idle" without driving the input shaft 20. A benefit of this arrangement is that the pinion 24 will not back drive the input shaft 20 and the electric motor which powers the vehicle. Back driving the electric motor is undesirable without significant and expensive controls which allow the motor M to act as a generator.

Figure 9:
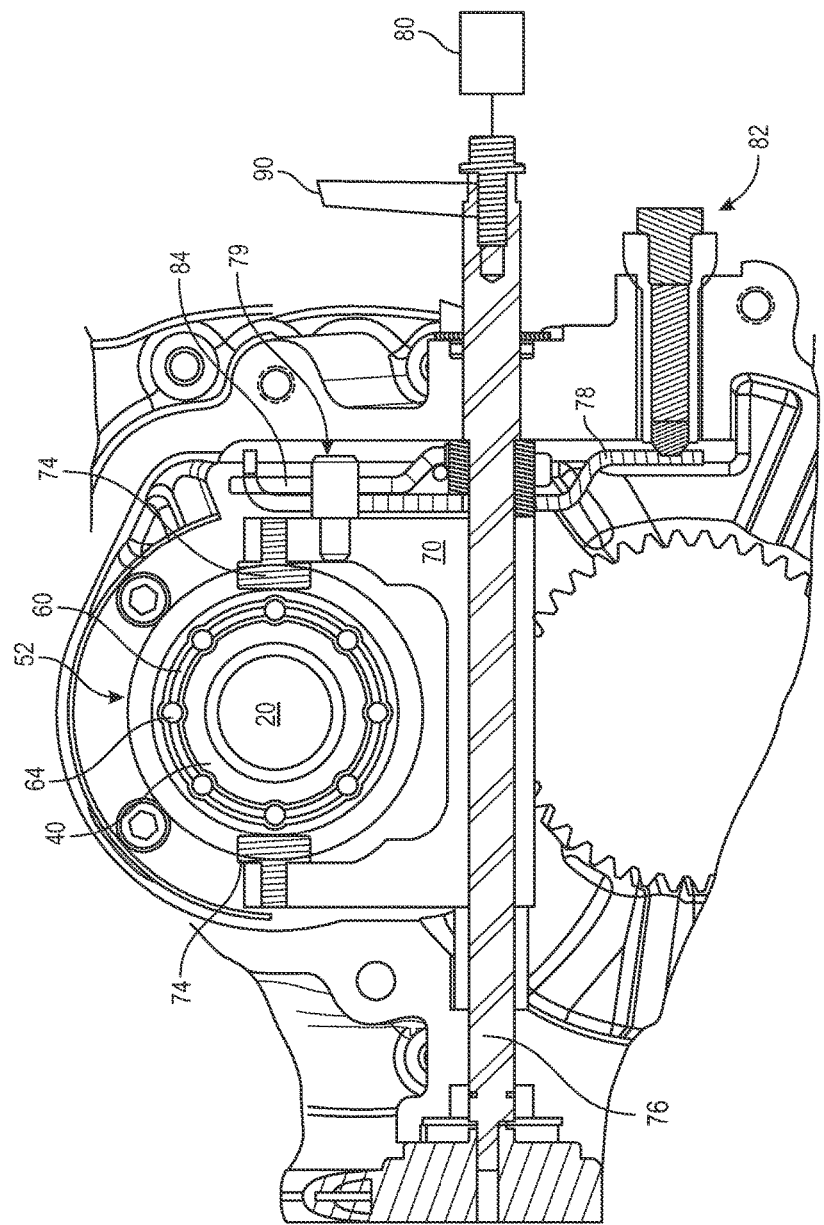
FIG. 9 is a cross-sectional view of the input portion of the transmission of FIG. 6 taken along line 9-9.

Referring to FIG. 9, a clutch yoke 70 drivingly engages the shift collar assembly 50. The yoke 70 includes opposed blade followers 74 which axially drivingly engage the shift collar groove 54. The shift collar assembly 50 may rotate relative to the clutch yoke 70. Because the annular clutch groove 54 is continuous about the shifting collar 48, the clutch groove 54 provides an engagement surface for the shift collar 52 regardless of the orientation of the shifting collar.

The yoke 70 is driven by a small electric motor 80. In a preferred embodiment in an electric vehicle, the motor 80 is powered by the vehicle battery pack B. Of course, a manually operated shift lever 90 may also be provided. The motor 80 or shift lever 90 are configured to rotate a pivot arm 76 which in turn rotates a detent plate 78. The detent plate 78 drives a drive pin 79 which is rigidly connected to the yoke 70. A detent assembly 82 engages detents in the detent plate 78 corresponding to the various clutch collar positions, as is well known in the art. A torsion spring 84 engages the drive pin 79 to bias the yoke 70 in a leftward direction as viewed in FIGS. 6-9, thereby providing a force to position the clutch collar in a detent corresponding to a proper clutch collar position. The spring 84 biases the yoke 70 from the Tow position toward the Drive or Park positions. The spring 84 also biases the yoke 70 from the Drive position toward the Tow position. When the grooves 22, 41, and 45 are not aligned, the spring 84 allows the pivot arm 76 (and shift lever 90 if one is used) to move into a proper detent position while the yoke 70 is blocked from final position until the grooves are aligned when the vehicle moves.

The descriptions of specific embodiments of the invention herein are intended to be illustrative and not restrictive. The invention may be practiced otherwise than as specifically explained and illustrated without departing from its spirit or scope as defined by the appended claims.

What is claimed is:

1. A transmission comprising:
    a housing, an input shaft rotatable about an axis, an output shaft, a gear set, and a rotatable clutch assembly coaxial with the input shaft for selectively drivingly connecting the input shaft and the output shaft through the gear set,
    the clutch assembly comprising a clutch collar and two axially spaced drive members, each drive member separate from the clutch collar and rotationally drivingly connected to the clutch collar,
    the clutch collar axially movable between (a) a drive position in which the input shaft is drivingly engaged with one drive member and the output shaft is drivingly engaged with the input shaft through the other drive member and the gear set, (b) a park position in which the gear set is drivingly engaged with one drive member and the other drive member is rotationally fixed to the housing, and (c) a neutral position in which the two drive members are disengaged from the input shaft.

2. The transmission as defined in claim 1 wherein the drive members are spheres.

3. The transmission as defined in claim 2 wherein the spheres drivingly engage a groove in the clutch collar.

4. The transmission as defined in claim 3 wherein the groove in the clutch collar groove extends axially.

5. The transmission as defined in claim 1 wherein each of the two axially spaced drive members comprise a plurality of circumferentially spaced spheres.

6. The transmission as defined in claim 5 wherein the clutch collar comprises circumferentially spaced grooves, wherein each of the plurality of spheres drivingly engages a groove.

7. The transmission as defined in claim 1 further comprising a third drive member rotationally drivingly connected to the clutch collar and axially spaced from the two drive members.

8. The transmission as defined in claim 7 wherein, in the drive position, the output shaft is drivingly engaged with the input shaft through the third drive member and the gear set.

9. The transmission as defined in claim 7 wherein, in the park position, the third drive member is under substantially no torque.

10. The transmission as defined in claim 7 wherein the clutch collar is axially movable to a tow position, wherein the output shaft is drivingly engaged with the clutch collar through the third drive member and the gear set.

11. The transmission as defined in claim 2 wherein the clutch assembly further comprises a cylindrical cage having radially extending apertures, wherein each of the two spheres are positioned by a cage aperture.

12. A transmission comprising:
    a housing, an axially extending input shaft having an outer surface defining a spline, an output shaft, a gear set, and a clutch for selectively drivingly connecting the input shaft and the output shaft through the gear set,
    the clutch comprising a collar coaxial with and surrounding the input shaft, the collar having a cylindrical inner surface, the inner surface defining an axially extending groove,
    two spherical drive members in driving rotational engagement with the collar through the collar groove,
    the collar axially movable between (a) a drive position in which one drive member is drivingly engaged with the input shaft and the other drive member is drivingly engaged with the gear set, (b) a park position in which one drive member is drivingly engaged with the gear set and the other drive member is rotationally fixed to the housing, and (c) a neutral position in which the two drive members are drivingly engaged with the gear set.

13. The transmission as defined in claim 12 further comprising a third spherical drive member rotationally drivingly connected to the clutch collar and axially spaced from the two drive members.

14. The transmission as defined in claim 13 wherein, in the drive position, the output shaft is drivingly engaged with the input shaft through the third drive member and the gear set.

15. The transmission as defined in claim 14 wherein, in the park position, the third drive member is under substantially no torque.

16. The transmission as defined in claim 15 wherein the clutch collar is axially movable to a tow position wherein the output shaft is drivingly engaged with the clutch collar through the third drive member and the gear set.

17. An electric battery driven vehicle comprising an electric motor drivingly engageable with a transmission for transmitting power from the electric motor, the transmission comprising a housing, an axially extending input shaft, an output shaft, a gear set, and a clutch for selectively drivingly connecting the input shaft and the output shaft through the gear set,
    the clutch comprising a collar and a first axially extending row of drive members rotationally drivingly engaged with the collar,
    the clutch movable between (a) a first position in which the input shaft and output shaft are drivingly engaged through the gear set, (b) a second position in which the output shaft is rotationally fixed to the housing, and (c) a third position in which the input shaft is disengaged from the output shaft.

18. The vehicle as defined in claim 17 further comprising a second row of axially extending drive members drivingly engaged with the collar, the second row circumferentially spaced from and generally parallel to the first row.

19. The vehicle as defined in claim 18 wherein each of the first and second rows comprises three drive members, wherein each of the drive members of the first row are circumferentially aligned with a drive member of the second row.

20. The vehicle as defined in claim 19 further comprising a second motor for axially moving the collar.

* * * * *